(12) United States Patent
Okamoto

(10) Patent No.: US 7,939,983 B2
(45) Date of Patent: May 10, 2011

(54) GENERATOR HAVING FIRST AND SECOND WINDINGS WITH SAME-DIRECTION ELECTROMOTIVE FORCES

(75) Inventor: Tetsuo Okamoto, Ehime (JP)

(73) Assignees: Norimasa Okamoto, Chiba (JP); Koji Nitta, Kanagawa (JP)

( * ) Notice: Subject to any disclaimer, the term of this patent is extended or adjusted under 35 U.S.C. 154(b) by 360 days.

(21) Appl. No.: 11/883,001

(22) PCT Filed: Sep. 14, 2006

(86) PCT No.: PCT/JP2006/318274
§ 371 (c)(1),
(2), (4) Date: Jul. 25, 2007

(87) PCT Pub. No.: WO2008/032384
PCT Pub. Date: Mar. 20, 2008

(65) Prior Publication Data
US 2009/0295247 A1 Dec. 3, 2009

(51) Int. Cl.
*H02K 31/00* (2006.01)
*H02K 21/26* (2006.01)
*H02K 21/12* (2006.01)
*H02K 1/22* (2006.01)

(52) U.S. Cl. .................. 310/178; 310/268; 310/156.01; 310/266; 310/267

(58) Field of Classification Search ............ 310/156.37, 310/156.36, 267, 268, 266, 156.01, 178; H02K 21/26, 21/12, 1/22, 31/00
See application file for complete search history.

(56) References Cited

U.S. PATENT DOCUMENTS

| | | | |
|---|---|---|---|
| 3,766,456 A | | 10/1973 | Carow |
| 4,547,713 A | * | 10/1985 | Langley et al. .......... 318/400.41 |
| 5,977,684 A | * | 11/1999 | Lin ................................ 310/268 |
| 6,175,178 B1 | * | 1/2001 | Tupper et al. ................. 310/166 |
| 6,973,010 B1 | * | 12/2005 | Koike et al. ................... 368/204 |
| 6,975,044 B2 | * | 12/2005 | Okamoto ...................... 290/1 R |
| 6,980,072 B2 | * | 12/2005 | Yumita et al. ................. 335/229 |
| 2004/0036374 A1 | | 2/2004 | Noble et al. |

(Continued)

FOREIGN PATENT DOCUMENTS

JP 49-38915 4/1974

(Continued)

*Primary Examiner* — Quyen Leung
*Assistant Examiner* — Terrance Kenerly
(74) *Attorney, Agent, or Firm* — Rabin & Berdo, PC

(57) ABSTRACT

There is provided a generator which produces electromotive forces in the same direction on all windings to prevent occurrence of leakage magnetic fields of the windings and lowering of the rotational forces of rotor plates due to the leakage magnetic fields from the windings and offers high efficiency without accompanying any circuit loads. The generator includes first windings 15-1 to 15-4 divided in the plural number and wound around a fixed ring core 5; second windings 25-1 to 25-4 divided in number equal to the plural number and wound around so as to cover divided gap portions of the first windings; and first and second rotor plates 30 and 35 provided to be opposed to both surfaces of the ring core 5, wherein the first rotor plate has first permanent magnets 40-1 to 40-4 opposed to the first windings, the second rotor plate has second permanent magnets 45-1 to 45-4 opposed to the second windings, and electricity generated on the first and second windings 15-1 to 15-4 and 25-1 to 25-4 is taken out by rotation of the first and second rotor plates 30 and 35.

5 Claims, 6 Drawing Sheets

U.S. PATENT DOCUMENTS

| | | | |
|---|---|---|---|
| 2004/0061397 A1* | 4/2004 | Rose | 310/156.37 |
| 2005/0029899 A1 | 2/2005 | Irving et al. | |
| 2005/0140234 A1* | 6/2005 | Okamoto | 310/156.37 |
| 2006/0208579 A1* | 9/2006 | Hohberger | 310/12 |
| 2006/0208605 A1* | 9/2006 | Aoyama et al. | 310/264 |
| 2007/0024144 A1* | 2/2007 | Obidniak | 310/156.36 |
| 2007/0046124 A1* | 3/2007 | Aydin et al. | 310/156.37 |
| 2007/0170877 A1* | 7/2007 | Hasegawa et al. | 318/115 |
| 2009/0091205 A1* | 4/2009 | Durham et al. | 310/156.62 |
| 2010/0066184 A1* | 3/2010 | Sakamoto et al. | 310/49.44 |

FOREIGN PATENT DOCUMENTS

| | | |
|---|---|---|
| JP | 3-127415 | 12/1991 |
| JP | 07-23547 | 1/1995 |
| JP | 09-105600 | 4/1997 |
| JP | 2006-238623 | 9/2006 |
| WO | WO-03/003546 A1 | 1/2003 |

* cited by examiner

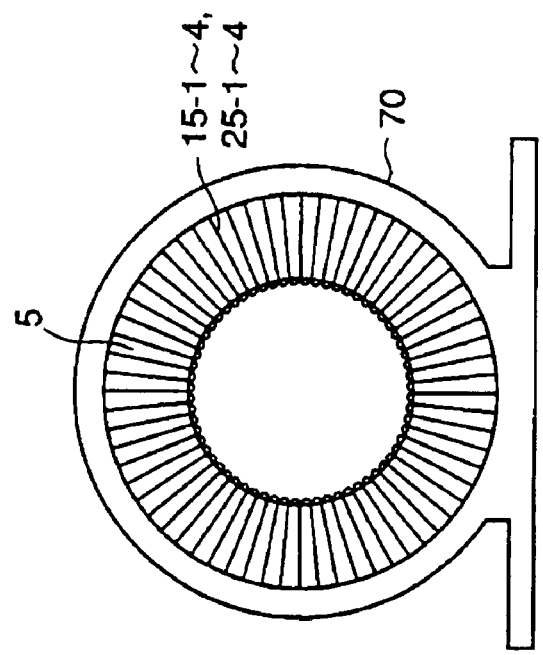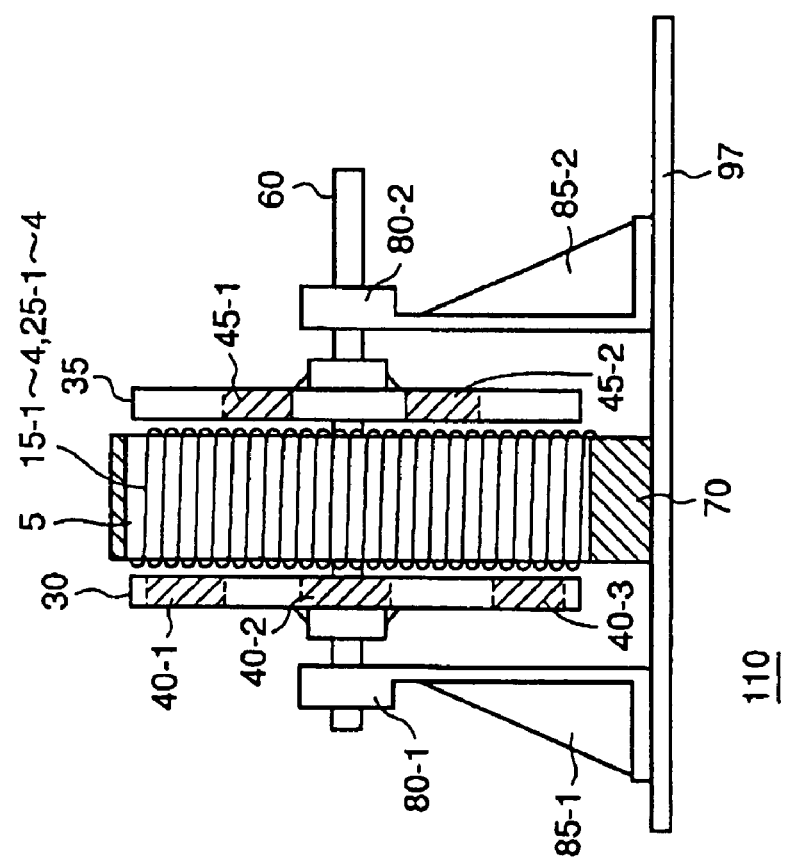

Fig. 5
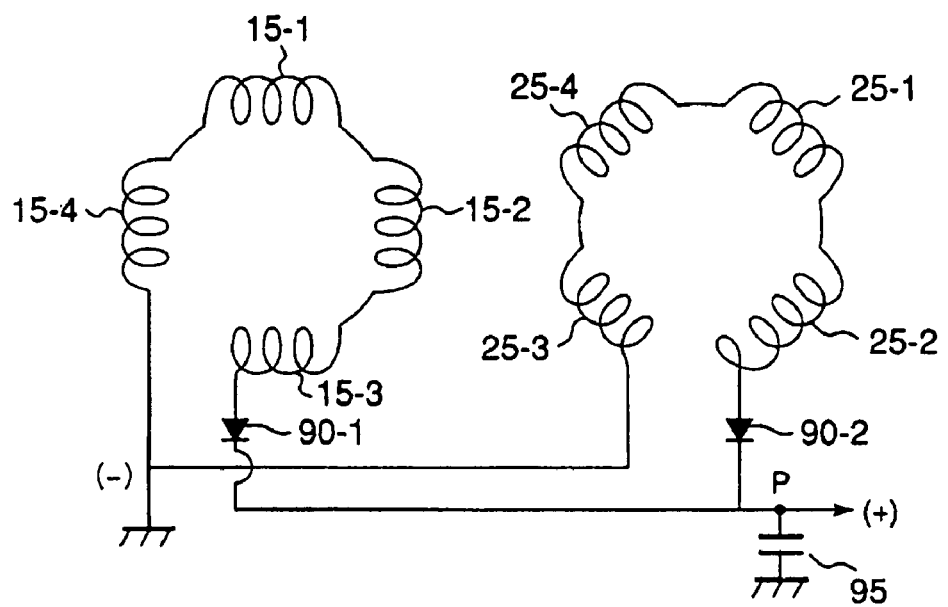
Fig. 6
Fig. 6a
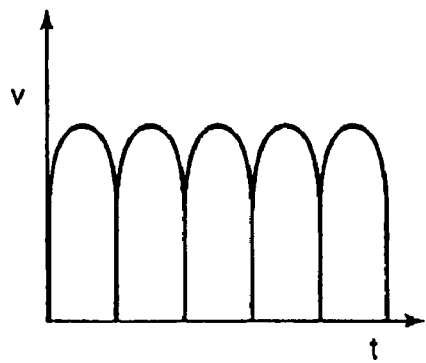
Fig. 6b
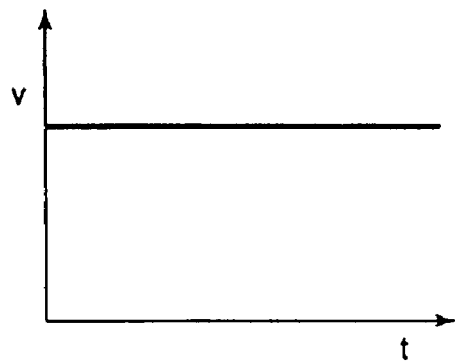

Fig. 7
PRIOR ART
Fig. 7a
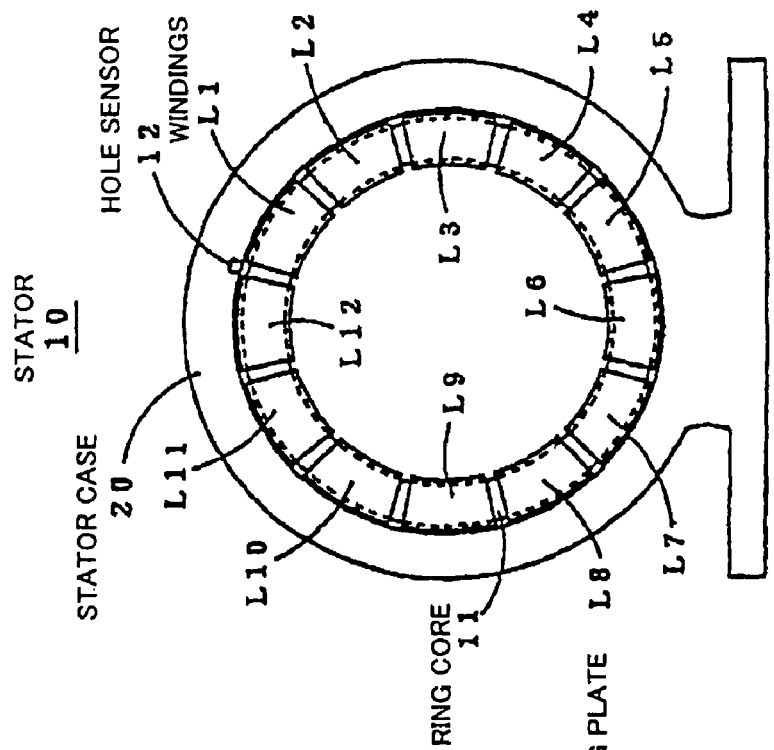
Fig. 7b
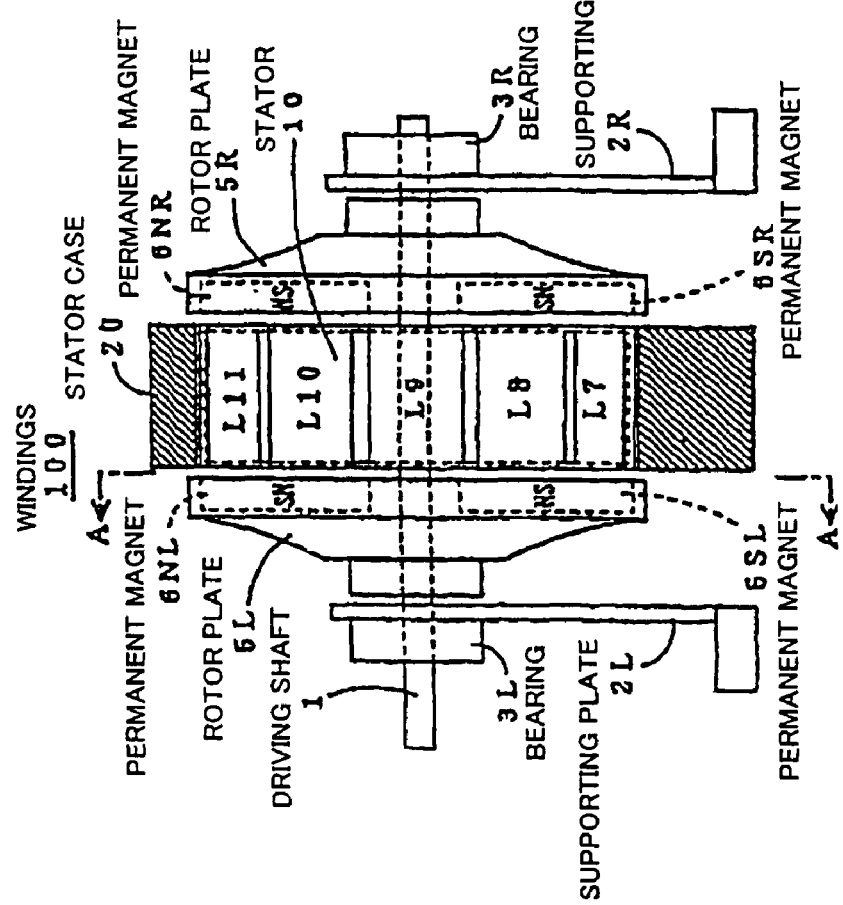

GENERATOR HAVING FIRST AND SECOND WINDINGS WITH SAME-DIRECTION ELECTROMOTIVE FORCES

TECHNICAL FIELD

The present invention relates to a generator which generates electricity by rotating permanent magnets with rotational forces applied from outside. More specifically, the present invention relates to a generator which directs electromotive forces of windings in the same direction to prevent occurrence of leakage fluxes and lowering of the rotational forces of rotor plates due to leakage magnetic fields, thereby increasing electricity generation efficiency.

BACKGROUND ART

Patent Document 1 describes a generator which generates electricity by rotating permanent magnets with rotational forces applied from outside. In FIG. 7a, the generator (100) includes a left rotor plate (5L) and a right rotor plate (5R) respectively disposed on two sides of a stator (10) held by a stator case (20). A semicircular permanent magnet (6NL) magnetized in the direction opposed to the stator (10) is adhered to the left rotor plate (5L) in such a manner that the North pole faces the stator (10). A semicircular permanent magnet (6SL) magnetized in the direction opposed to the stator (10) is adhered to the left rotor plate (5L) in such a manner that the South pole faces the stator (10). Similarly, a semicircular permanent magnet (6NR) magnetized in the direction opposed to the stator (10) is adhered to the right rotor plate (5R) in such a manner that the North pole faces the stator (10). Further, a semicircular permanent magnet (6SR) magnetized in the direction opposed to the stator (10) is adhered to the right rotor plate (5R) in such a manner that the South pole faces the stator (10).

In FIG. 7b, the stator (10) has toroidally wound windings (L1) to (L12) around a ring core (11) at an equal angle. A hole sensor 12 is provided between the windings (L12) and (L1). In FIG. 8, the windings (L1) to (L6) are connected in series via rectifiers (D1) to (D5). The winding (L6) is connected to a first end of a first TRIAC (T1) via a rectifier (D6). The windings (L7) to (L12) are connected in series via rectifiers (D7) to (D11). The winding (L12) is connected to a first end of a second TRIAC (T2) via a rectifier (D12). The rectifiers (D1 to D12) have storage circuits (H1 to H12), respectively. Second ends of the first and second TRIACs (T1 and T2) are connected to a capacitor (C) via current suppression resistances R1 and R2.

When the left rotor plate (5L) and the right rotor plate (5R) are rotated, the polarity of a magnetic flux detected by the hole sensor (12) is inverted from the South pole to the North pole so that the first TRIAC (T1) is turned on and the second TRIAC (T2) is turned off. When the left rotor plate (5L) and the right rotor plate (5R) are further rotated, electromotive forces in the forward direction of the rectifiers (D1) to (D6) are produced on the windings (L1) to (L6) so as to change the storage circuits (H1) to (H6). At this time, the voltages of the storage circuits (H1) to (H6) are added. The capacitor (C) is charged by the voltage of the storage circuit (H6) via the first TRIAC (T1) and the current suppression resistance (R1) to output a direct current from both ends of the capacitor (C).

When the left rotor plate (5L) and the right rotor plate (5R) are further rotated, the polarity of a magnetic flux detected by the hole sensor (12) is inverted from the North pole to the South pole causing the first TRIAC (T1) being turned off and the second TRIAC (T2) being turned on. When the left rotor plate (5L) and the right rotor plate (5R) are further rotated, electromotive forces in the forward direction of the rectifiers (D7) to (D12) are produced on the windings (L7) to (L12) to charge the storage circuits (H7) to (H12), and the voltages of the storage circuits (H7) to (H12) are added. The capacitor (C) is charged by the voltage of the storage circuit (H12) via the second TRIAC (T2) and the current suppression resistance (R2) to output a direct current from both ends of the capacitor (C).

As described above, a magnetic field is generated on the left rotor plate (5L) from the permanent magnets (6NL) to (6SL); a magnetic field is generated on the right rotor plate (5R) in a direction from the permanent magnets (6NR) to (6SR); and the left rotor plate (5L) and the right rotor plate (5R) are rotated to produce in-phase and anti-phase electromotive forces with each other on the windings (L1) to (L6) and the windings (L7) to (L12). There has been a problem that when electricity is taken out from the windings (L1) to (L6) of the toroidal windings (L1) to (L12) of the ring core (11) of the stator (10), it cannot be taken out from the windings (L7) to (L12).

The hole sensor (12), the first TRIAC (T1), and the second TRIAC (T2) need to be provided to cut the anti-phase electromotive force, thereby becoming an accompanying circuit load. The electromotive forces produced on the windings (L1) to (L6) and the windings (L7) to (L12) are anti-phase with each other, so that the magnetic fields generated on the windings (L1) to (L6) and the windings (L7) to (L12) are directed in an opposite direction with each other due to the electromotive forces. Leakage magnetic fields may occur from the windings, thereby lowering the rotational forces of the rotor plates and the electricity generation efficiency.

[Patent Document 1] Japanese Patent Application Laid-Open Publication No. 3783141

DISCLOSURE OF THE INVENTION

Problems to be Solved by the Invention

The present invention has been made to solve such problems and an object of the present invention is to provide a generator which produces electromotive forces in the same direction on all windings to prevent occurrence of leakage magnetic fields of the windings and lowering of the rotational forces of rotor plates due to the leakage magnetic fields from the windings and offers high efficiency without any circuit loads.

Means for Solving the Problems

A generator of the present invention has first windings divided in the plural number and wound around a fixed ring core; second windings divided in number equal to the plural number and wound around so as to cover divided gap portions of the first windings; and first and second rotor plates provided to be opposed to both surfaces of the ring core, wherein the first rotor plate has first permanent magnets in number equal to the plural number and provided to be opposed to the divided first windings, wherein the second rotor plate has second permanent magnets in number equal to the plural number and provided to be opposed to the divided second windings, wherein electricity generated on the first and second windings is taken out by rotation of the first and second rotor plates.

In the generator of the present invention, the first and second windings have a same number of turns and a same winding direction.

The first and second rotor plates of the generator of the present invention have at their center a shared driving shaft for rotation, a first magnetic path forming plate for forming a magnetic path between the driving shaft and the first magnet, and a second magnetic path forming plate for forming a magnetic path between the driving shaft and the second magnet.

In the generator of the present invention, one end of the first winding is grounded, the other end thereof is connected to the positive pole of a first rectifier, one end of the second winding is grounded, the other end thereof is connected to the positive pole of a second rectifier, the negative poles of the first and second rectifiers are connected to one end of a capacitor, the other end of the capacitor is grounded, and electricity is taken out from the one end of the capacitor.

According to the generator of the present invention, it is possible to provide a generator which can produce electromotive forces in the same direction on all windings to prevent occurrence of leakage magnetic fields of the windings and lowering of the rotational forces of rotor plates due to the leakage magnetic fields from the windings and offers high efficiency without any circuit loads for cutting electromotive forces in the opposite direction.

BRIEF DESCRIPTION OF THE DRAWINGS

FIGS. 1a and 1b are block diagrams showing the constitution of a generator of the present invention;

FIG. 5 is an electric circuit diagram of the generator of the present invention;

FIGS. 6a and 6b are diagrams showing output waveforms at a connection node P;

FIGS. 7a and 7b are a front view and a side view of a conventional generator.

BEST MODE FOR CARRYING OUT THE INVENTION

Figure 2A:
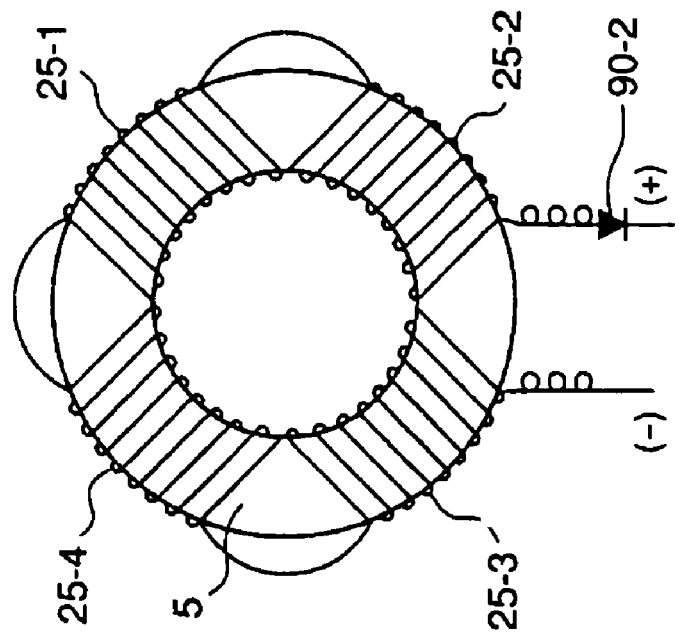
FIGS. 2a and 2b are winding explosive views of a ring core of the present invention.

An embodiment of the present invention will be described with reference to the drawings. FIGS. 1a and 1b are block diagrams showing the constitution of a generator of the present invention. In FIG. 1a, a stator 70 of a generator 110 is fixed onto a base 97 and a ring core 5 around which first windings 15-1 to 15-4 and second windings 25-1 to 25-4 are wound is provided in the stator 70. A first rotor plate 30 and a second rotor plate 35 are provided on bearings 80-1 and 80-2 having supporting plates 85-1 and 85-2 via a driving shaft 60. The bearings 80-1 and 80-2 are fixed onto the base 97. The first rotor plate 30 and the second rotor plate 35 have first permanent magnets 40-1 to 40-4 and 45-1 to 45-4, respectively. The driving shaft 60 obtains rotation driving torque from outside (not shown), and rotates the first rotor plate 30 and the second rotor plate 35 to generate rotation magnetic fields.

Figure 2B:
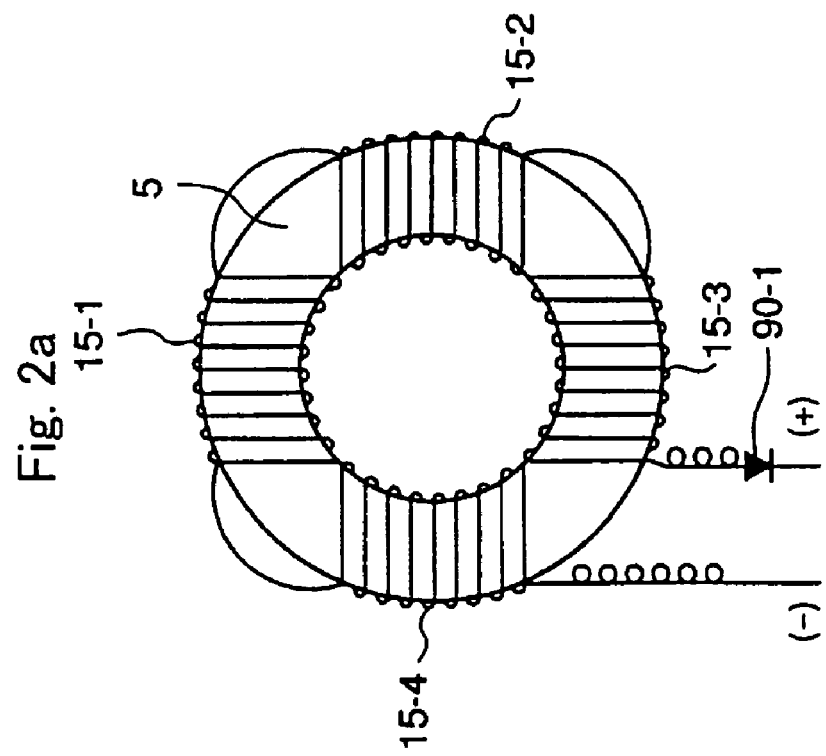

In FIG. 1b, the ring core 5 around which the first windings 15-1 to 15-4 and the second windings 25-1 to 25-4 are wound is fitted into the stator 70. FIGS. 2a and 2b are views of the ring core illustrating in detail that the first windings 15-1 to 15-4 and the second windings 25-1 to 25-4 are wound around the ring core 5 of FIG. 1b. In FIG. 2a, the first windings 15-1 to 15-4 are arranged at an angle of 90 degrees to each other, and are wound around the ring core 5 in such a manner that the first windings 15-1 and 15-3 are opposed to each other, and the first windings 15-2 and 15-4 are opposed to each other. In FIG. 2b, the second windings 25-1 to 25-4 are arranged at an angle of 90 degrees to each other, are wound around the ring core 5 in such a manner that the second windings 25-1 and 25-3 are opposed to each other and the second windings 25-2 and 25-4 are opposed to each other, and are wound in the same direction and in the same number of turns as the first windings 15-1 to 15-4. The second windings 25-1 to 25-4 are displaced 45 degrees from the first windings 15-1 to 15-4 so as to cover gap portions of the first windings 15-1 to 15-4.

Figure 3:
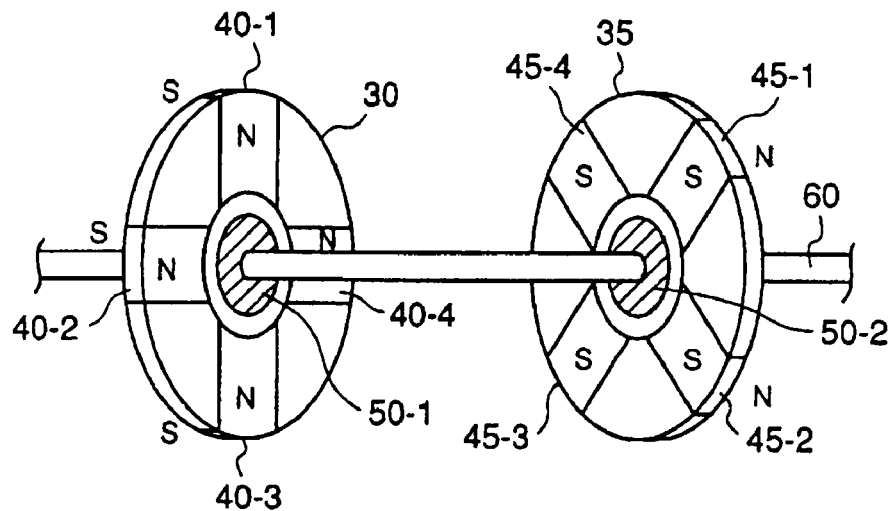
FIG. 3 is a block diagram of rotor plates of the present invention.

FIG. 3 is a rotor plate block diagram explaining in more detail the constitution of the first rotor plate 30 and the second rotor plate 35 of FIG. 1a. The first permanent magnets 40-1 to 40-4 are arranged at an angle of 90 degrees to each other, and are provided on the first rotor plate 30 in such a manner that the first permanent magnets 40-1 and 40-3 are opposed to each other and the first permanent magnets 40-2 and 40-4 are opposed to each other. The second permanent magnets 45-1 to 45-4 are arranged at an angle of 90 degrees to each other, and are provided on the second rotor plate 35 in such a manner that the second permanent magnets 45-1 and 45-3 are opposed to each other and the second permanent magnets 45-2 and 45-4 are opposed to each other. The first rotor plate 30 and the second rotor plate 35 are fixed onto the driving shaft 60 in such a manner that the first permanent magnets 40-1 to 40-4 and the second permanent magnets 45-1 to 45-4 are displaced 45 degrees from each other. The first rotor plate 30 and the second rotor plate 35 have magnetic path forming plates 50-1 and 50-2, respectively, and form magnetic paths of the first permanent magnets 40-1 to 40-4 and the second permanent magnets 45-1 to 45-4. The magnetic path forming plates 50-1 and 50-2 may form magnetic paths by forming the entire first and second rotor plates 30 and 35 using an iron material.

Figure 4:
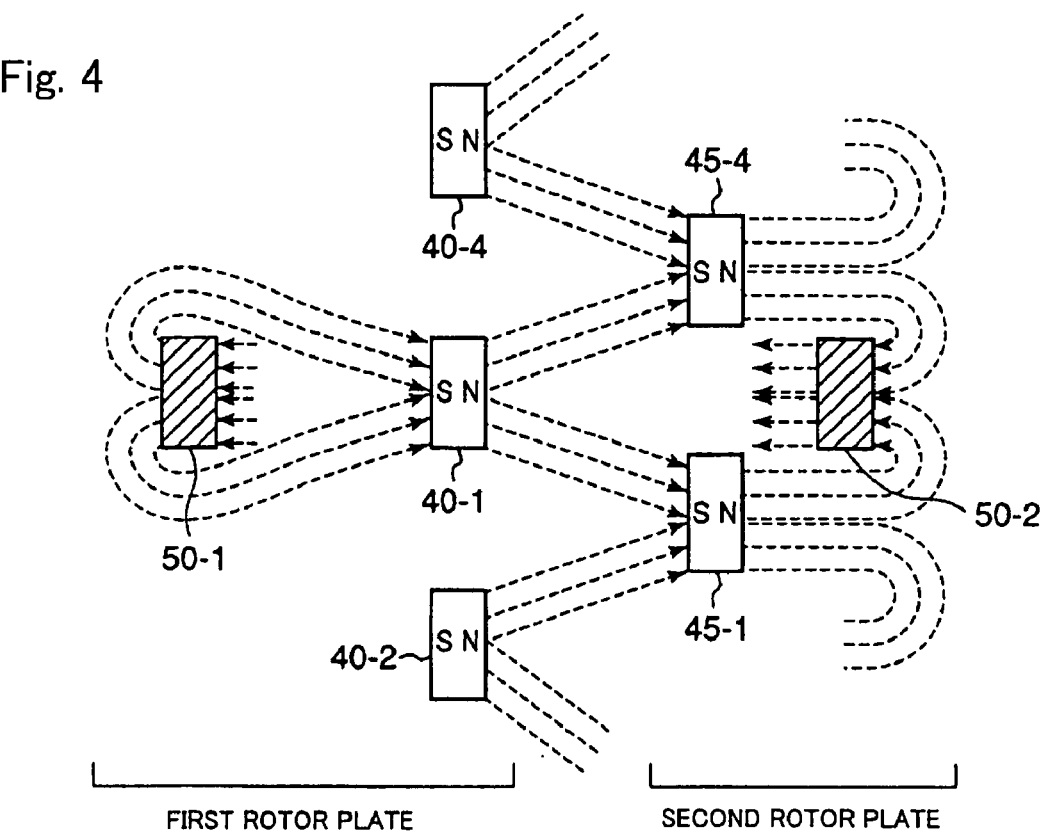
FIG. 4 is a magnetic path forming diagram showing magnetic paths of a first rotor plate and a second rotor plate.
Figure 8:
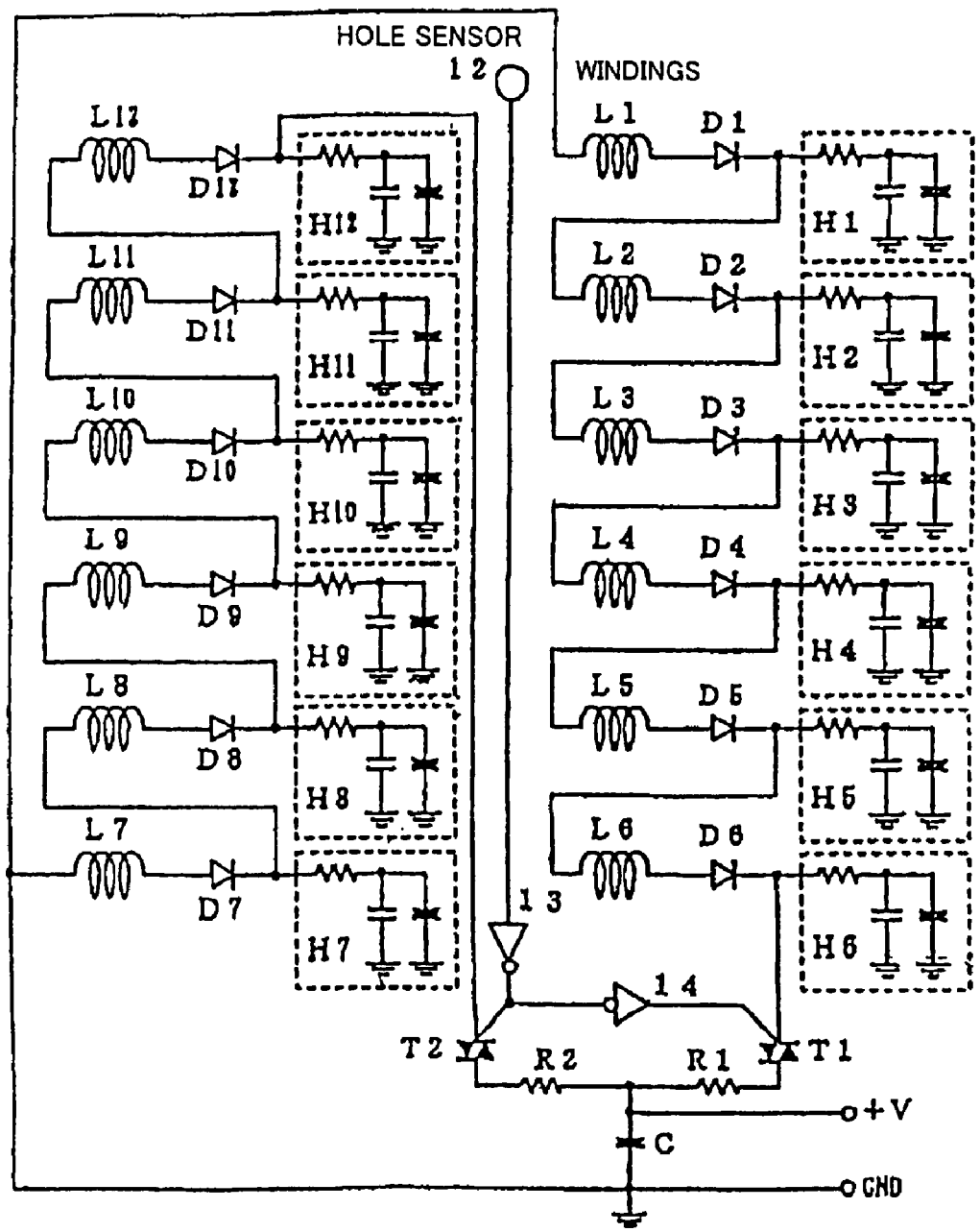
FIG. 8 is a circuit diagram showing electric connection of the conventional generator.

FIG. 4 is a magnetic path forming diagram showing magnetic path formation and magnetic field directions of the first rotor plate 30 and the second rotor plate 35. In FIG. 4, magnetic fields are generated from the North pole of the first permanent magnet 40-1 of the first rotor plate 30 to the South poles of the second permanent magnets 45-1 and 45-4 of the second rotor plate 35. The magnetic fields form magnetic paths returning from the North poles of the second permanent magnets 45-1 and 45-4 via the magnetic path forming plates 50-2 and 50-1 to the South pole of the first permanent magnet 40-1. When the first rotor plate 30 and the second rotor plate 35 are rotated by receiving rotational torque of the driving shaft 60, rotation magnetic fields of the magnetic paths shown in FIG. 4 are generated to produce electromotive forces in the same direction on the first windings 15-1 to 15-4 and the second windings 25-1 to 25-4. This can produce the electromotive forces in the same direction on all windings and can effectively use all generated magnetic fields. There is shown the embodiment in which the number of division of the windings and the number of division of the magnets are four. The number of division of the windings and the magnets may be eight. The number of division is not limited to this.

FIG. 5 is an electric circuit diagram of the generator of the present invention. The first windings 15-1 to 15-4 are connected in series, the open end of the first winding 15-4 is grounded, and the open end of the first winding 15-3 is connected to the positive pole of a rectifier 90-1. In the same manner, the second windings 25-1 to 25-4 are connected in series, the open end of the second winding 25-3 is grounded, and the open end of the second winding 25-2 is connected to the positive pole of a rectifier 90-2. The negative poles of the rectifiers 90-1 and 90-2 are connected to one end of a capacitor 95 and electromotive forces are taken out from its connection node P. The other end of the capacitor 95 is grounded. Magnetic fields generated by the electromotive forces in the same direction produced on the first windings 15-1 to 15-4 and the second windings 25-1 to 25-4 are all in the same direction and are completely confined within the ring core 5. The rotational forces of the rotor plates 30 and 35 due to leakage magnetic fields from the windings and the electricity generation efficiency cannot be lowered.

FIGS. 6a and 6b are diagrams showing output waveforms at the connection node P. In FIG. 6a, the synthesized wave of the electromotive forces in the same direction on the first windings 15-1 to 15-4 and the second windings 25-1 to 25-4 becomes a ripple current with respect to a time axis to be inputted to the capacitor 95. In FIG. 6b, the synthesized wave stacked on the capacitor 95 can be taken out as a flat direct current component. The direct current component is converted to an alternate current component by a converter to be boosted by a transformer and can be supplied as electricity for home use.

INDUSTRIAL APPLICABILITY

As described above, according to the present invention, electromotive forces in the forward direction can be produced on all windings and all generated magnetic fields can be used effectively. Occurrence of leakage magnetic fields of the windings can be prevented. The rotational forces of rotor plates due to the leakage magnetic fields from the windings and the electricity generation efficiency cannot be lowered. No special circuit loads for cutting electromotive forces in the opposite direction can be accompanied. A generator which has a simple electric circuit and offers high efficiency can be provided.

The invention claimed is:
1. A generator comprising:
a fixed ring core;
a predetermined plural number of first windings wound around said ring core, the first windings being spatially separated from, and serially connected to each other, said first windings having a plurality of gap portions therebetween;
a plurality of second windings equal in number to said predetermined plural number and wound around said ring core, the second windings being spatially separated from, and serially connected to each other, said second windings covering said gap portions of said first windings; and
first and second rotor plates respectively opposed to two surfaces of said ring core,
said first rotor plate having a plurality of first permanent magnets equal in number to said predetermined plural number, being opposed to said first windings, and being arranged in such a manner that a same magnetic pole appears, with a plurality of first gaps each being formed between two neighboring ones of the plurality of first permanent magnets,
said second rotor plate having a plurality of second permanent magnets equal in number to said predetermined plural number, being opposed to said second windings, and being arranged in such a manner that a magnetic pole opposite to said same magnetic pole appears, with a plurality of second gaps each being formed between two neighboring ones of the plurality of second permanent magnets,
wherein
said first windings are wound around said ring core in a manner opposed to said first permanent magnets,
said second windings are wound around said ring core in a manner opposed to said second permanent magnets,
said first and second windings have a same number of turns and a same winding direction,
each of the first windings is opposed to a corresponding one of said second gaps,
each of the second windings is opposed to a corresponding one of said first gaps, and
electricity generated on said first and second windings is taken out by rotation of said first and second rotor plates.

2. The generator according to claim 1, wherein said first and second rotor plates have at their center a shared driving shaft for rotation, a first magnetic path forming plate for forming a magnetic path between said driving shaft and said first permanent magnet, and a second magnetic path forming plate for forming a magnetic path between said driving shaft and said second permanent magnet.

3. The generator according to claim 1, wherein one end of said first windings is grounded, the other end thereof is connected to the positive pole of a first rectifier, one end of said second windings is grounded, the other end thereof is connected to the positive pole of a second rectifier, the negative poles of said first and second rectifiers are connected to one end of a capacitor, the other end of said capacitor is grounded, and electricity is taken out from said one end of said capacitor.

4. The generator according to claim 2, wherein one end of said first windings is grounded, the other end thereof is connected to the positive pole of a first rectifier, one end of said second windings is grounded, the other end thereof is connected to the positive pole of a second rectifier, the negative poles of said first and second rectifiers are connected to one end of a capacitor, the other end of said capacitor is grounded, and electricity is taken out from said one end of said capacitor.

5. The generator of claim 1, wherein each of the first wings is displaced substantially 45 degrees from a neighboring one of the second wings.

* * * * *